United States Patent Office 3,247,231
Patented Apr. 19, 1966

3,247,231
SYMMETRICAL ANHYDRIDES OF HYDROXY HIGHER FATTY ACIDS
Thomas H. Applewhite, Concord, and Jane S. Nelson, Berkeley, Calif., assignors to the United States of America as represented by the Secretary of Agriculture
No Drawing. Filed Apr. 2, 1963, Ser. No. 270,116
6 Claims. (Cl. 260—413)

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of new organic compounds, namely, symmetrical anhydrides of hydroxy acids, and methods for preparing them. Further objects of the invention will be evident from the following description wherein parts and percentages are by weight unless otherwise specified.

It is known in the art that certain acids may be converted into their symmetrical anhydrides by reacting (1) a tertiary amine salt of the acid with (2) a mixed (carboxylic-carbonic) anhydride of the same acid. A typical synthesis in this field (Shipper and Nichols, Jour. Am. Chem. Soc., 80, pp. 5714–57717) involves preparation of symmetrical oleic anhydride by reaction of (1) the triethylamine salt of oleic acid with (2) a mixed oleic-carbonic anhydride of the formula—

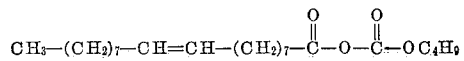

prepared by reacting oleic acid triethylamine salt with isobutyl chloroformate.

It has now been found that the procedure outlined above may be applied to hydroxy acids whereby to prepare symmetrical anhydrides of hydroxy acids, compounds hitherto unknown and believed incapable of formation because they would involve the coexistence of normally incompatible hydroxy and anhydride groups. Generically, the products of the invention are symmetrical anhydrides of hydroxy aliphatic carboxylic acids containing at least eight carbon atoms. Depending on the acid from which they are derived, the products may be saturated or unsaturated and may contain two or more hydroxy groups per molecule. Typical illustrative examples of compounds within the ambit of the invention are the symmetrical anhydrides of: mono-, di-, and tri-hydroxy caprylic acids; mono-, di-, and tri-hydroxy nonylic acids; mono-, di-, and tri-hydroxy capric acids; mono-, di-, and tri-hydroxy undecylic acids; mono-, di-, and tri-hydroxy lauric acids; mono-, di-, and tri-hydroxy tridecylic acids; mono-, di-, and tri-hydroxy myristic acids; mono-, di-, and tri-hydroxy pentadecylic acids; mono-, di-, and tri-hydroxy palmitic acids; mono-, di-, and tri-hydroxy margaric acids; mono-, di-, and tri-hydroxy stearic acids; mono-, di-, and tri-hydroxy arachidic acids; mono-, di-, and tri-hydroxy behenic acids; etc. Among the preferred compounds of the invention are symmetrical anhydrides derived from the $C_{18}$ hydroxy fatty acids, saturated or unsaturated, typically the mono- or poly-hydroxy substituted stearic, oleic, or linoleic acids. Among such products may be enumerated the following for purpose of illustration: 6-hydroxyoctadecanoic anhydride, 7-hydroxyoctadecanoic anhydride, 12-hydroxyoctadecanoic anhydride, 9,10-dihydroxyoctadecanoic anhydride, 11,12-dihydroxyoctadecanoic anhydride, 9,10,12-trihydroxyoctadecanoic anhydride, 12-hydroxy-cis-9-octadecenoic anhydride, 12-hydroxy-trans-9-octadecenoic anhydride, etc. The two last-named compounds may also be designated as ricinoleic and ricinelaidic anhydrides, respectively.

The products of the invention are generally solid materials, crystalline in a pure state, and are stable when stored at room temperature or below. When heated at temperatures well above their melting points they are slowly decomposed, giving polymeric esters and an acidic material of unknown composition. The compounds are eminently useful as starting materials for the preparation of esters and amides by application of conventional syntheses. Typically the amides, especially the morpholides, are useful as plasticizers for vinyl chloride, vinyl acetate copolymers, and cellulose acetate, as well known in the art.

The novel compounds of the invention are prepared by reacting (1) a tertiary amine salt of the selected hydroxy acid with (2) a mixed (carboxylic-carbonic) anhydride of the same hydroxy acid. The reaction is generally carried out at ordinary (room) temperature for convenience. However, lower or higher temperatures can be used if desired. For example, the reaction temperature may be as low as about minus 10° C., although it is obvious that at such temperatures the reaction rate will decrease and it may require more solvent to keep the reactants in solution. Generally, temperatures over about 40° C. should be avoided to prevent decomposition of the mixed anhydride or the product. The reactants are generally employed in the equimolar proportions as involved in the reaction, i.e., one mole salt plus one mole mixed anhydride yields essentially one mole of symmetrical anhydride product. To promote good contact between the reactants the reaction is carried out in a conventional inert solvent, for example, tetrahydrofuran, benzene, toluene, xylene, etc. After the reaction is completed the products may be recovered in various different ways. A suitable plan involves evaporation under vacuum of the solvent from the reaction mixture followed by extraction of the residue with a solvent such as ether or chloroform. The resulting solution is washed with dilute acid, dilute base, then with water. After this solution is dried over a desiccant the solvent is evaporated, leaving the pure symmetrical anhydride.

The course of the synthesis in accordance with the invention is shown by the following equation:

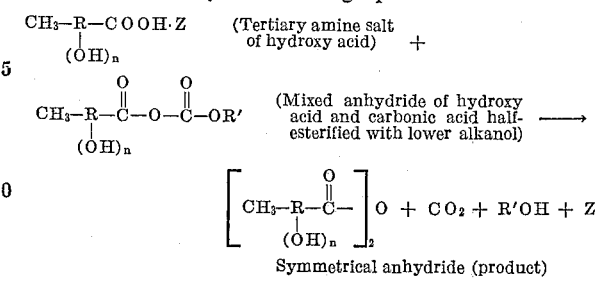

In the above formulae, R stands for an aliphatic hydrocarbon chain containing at least 7 carbon atoms, R' is a lower alkyl radical, Z is a tertiary amine, and $n$ is an integer from 1 to 4.

A consideration of the above equation demonstrates the unexpected nature of the present invention. Thus it would be expected that the mixed anhydride would react with the hydroxy (alcohol) group on the tertiary amine salt, forming an ester. Such reaction does not, in fact, occur and the desired symmetrical anhydrides are produced in high, virtually quantitative, yields.

The starting materials for the reaction (the salt and the mixed anhydride) may be prepared by methods well known in the art. For example, the salt may be formed by mixing the hydroxy acid with an equimolar amount of a tertiary amine. The nature of the tertiary amine has no critical effect and various compounds may be used, as for example triethylamine, triisopropylamine, pyridine, N-methyl piperidine, N-ethyl piperidine, tri-n-butylamine, and the like. The mixed anhydride is conveniently prepared in known manner by reacting a tertiary amine salt of the hydroxy acid with an equimolar quantity of a lower alkyl chloroformate, for example ethyl, propyl, isopropyl, isobutyl or n-butyl chloroformate. The mixed anhydrides may also be considered as an anhydride of the hydroxy acid and carbonic acid half-esterified with a lower alkanol. In general, the mixed anhydride need not be subjected to any isolation treatment but the total reaction product of the hydroxy acid and the alkyl chloroformate is used directly for reaction with the hydroxy acid-tertiary amine salt. Ordinarily, the hydroxy acid from which the salt and the mixed anhydride is prepared is in a relatively pure state. However, it is within the purview of the invention to utilize commercial or technical grades of hydroxy acids such as those obtained by hydrolysis of castor oil or other oil rich in hydroxy fatty acids. It is, of course, obvious that in such case the end product will contain not only symmetrical anhydrides of hydroxy acids but also anhydrides of non-hydroxy acids and also, very likely, anhydrides wherein one moiety is derived from a hydroxy acid and the other from a non-hydroxy acid.

The invention is further demonstrated by the following illustrative examples. The melting points referred to in the examples were obtained in capillary tubes in an electrically heated block and are uncorrected. Infrared spectra were obtained as Nujol mulls, using a Perkin-Elmer Model 137 Infracord with sodium chloride optics.

EXAMPLE I (A) *Preparation of mixed anhydride*

A solution containing triethylamine (1.53 ml., 0.011 mole) and 12-hydroxy-cis-9-octadecenoic acid (3.3 g., 0.011 mole) in 100 ml. tetrahydrofuran was cooled to minus 5° C. and ethyl chloroformate (1.05 ml., 0.011 mole) was added slowly while maintaining the temperature below 0° C. The mixture was held at about 0° C. with stirring for 20 minutes. This product contained the mixed carboxylic-carbonic anhydride,

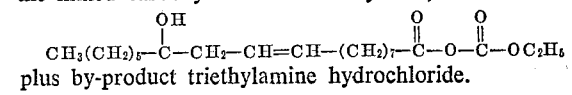

plus by-product triethylamine hydrochloride.

(B) *Production of symmetrical anhydride*

Triethylamine (0.011 mole) and 12-hydroxy-cis-9-octadecenoic acid (0.011 mole) were dissolved in 50 ml. of tetrahydrofuran. This solution was added from a dropping funnel into the product of part A above, while stirring and maintaining the temperature at or near 0° C. with an ice-salt bath. Following the addition, the system was allowed to come to room temperature with stirring and let stand overnight. The solution was then filtered to remove precipitated triethylamine hydrochloride and the precipitate washed with additional tetrahydrofuran. The filtrate and washings were combined and the solvent removed in vacuo at room temperature on a rotary evaporator. The product was taken up in ether or chloroform and the resulting solution washed with dilute hydrochloric acid, 1 M sodium carbonate, followed by water until the washes tested neutral to pH paper. The organic solution was dried over $MgSO_4$, filtered, and returned to the rotary evaporator for removal of solvent at room temperature. The product, symmetrical 12-hydroxy-cis-9-octadecenoic anhydride,

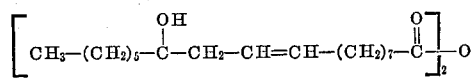

was obtained in 95% yield.

EXAMPLES II TO V

The procedure as described in Example I was repeated, substituting for the 12-hydroxy-cis-9-octadecenoic acid the following acids: 12-hydroxy-trans-9-octadecenoic acid, 12-hydroxyoctadecanoic acid, 9,10,12-trihydroxyoctadecanoic acid, and 9,10-dihydroxyoctadecanoic acid.

The yields and properties of the compounds of Examples I to V are summarized in the following table:

SYMMETRICAL HYDROXY ACID ANHYDRIDES $$(R-\overset{O}{\underset{\|}{C}})_2O$$

| Example | R | Yield, percent of theory | Melting point, °C | Infrared bands, carbonyl region μ | Analysis Calculated C, percent | Calculated H, percent | Found C, percent | Found H, percent |
|---|---|---|---|---|---|---|---|---|
| I | $CH_3-(CH_2)_5-\underset{H}{\overset{OH}{C}}-CH_2-CH=CH-(CH_2)_7-$ cis | 95 | 35–35.5 | 5.56 / 5.76 | 74.7 | 11.5 | 74.5 | 11.4 |
| II | $CH_3-(CH_2)_5-\underset{H}{\overset{OH}{C}}-CH_2-CH=CH-(CH_2)_7-$ trans | 96 | 64–64.5 | 5.52 / 5.76 | 74.7 | 11.5 | 74.7 | 11.4 |
| III | $CH_3-(CH_2)_5-\overset{OH}{C}H-(CH_2)_{10}-$ | 99 | 88–89 | 5.52 / 5.77 | 74.2 | 12.1 | 74.1 | 12.1 |
| IV | $CH_3-(CH_2)_5-\overset{OH}{C}H-CH_2-\overset{OH}{C}H-\overset{OH}{C}H-(CH_2)_7-$ | 100 | 132–133 | 5.52 / 5.72 | 66.8 | 10.9 | 66.9 | 10.9 |
| V | $CH_3-(CH_2)_7-\overset{OH}{C}H-\overset{OH}{C}H-(CH_2)_7-$ | 100 | 91–92 | 5.52 / 5.72 | 70.3 | 11.5 | 70.5 | 11.4 |

EXAMPLE VI

Each of the products of Examples I to V were converted into the corresponding amides by the following technique: The symmetrical anhydride was dissolved in tetrafuran and anhydrous ammonia gas (in excess of 2 moles $NH_3$ per mole anhydride) was passed through the solution at room temperature. The tetrahydrofuran was removed on the rotary evaporator, leaving as a residue the hydroxy acid ammonium salt and the corresponding ing amide. These product mixtures were dissolved in absolute methanol and the solutions treated with an anion exchange resin to absorb the hydroxy acid. The effluent was treated by evaporation of solvent and recrystallization to obtain the amide. The products and their properties are summarized below:

| Compound | Melting point, °C. | Infrared carbonyl band, μ |
|---|---|---|
| 12-hydroxy-cis-9-octadecenamide | 65.5–66.5 | 6.03 |
| 12-hydroxy-trans-9-octadecenamide | 86.5–87.5 | 6.02 |
| 12-hydroxyoctadecanamide | 111–112 | 6.02 |
| 9,10,12-trihydroxyoctadecanamide | 136–137 | 6.05 |
| 9,10-dihydroxyoctadecanamide | 113–113.5 | 6.08 |

Having thus described the invention, what is claimed is:

1. A symmetrical anhydride of a hydroxyaliphatic carboxylic acid containing at least 8 carbon atoms, having the structure:

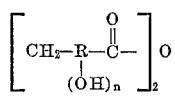

wherein R stands for an aliphatic hydrocarbon chain containing at least 7 carbon atoms and $n$ is an integer from 1 to 4.

2. The symmetrical anhydride of 12-hydroxy-cis-9-octadecenoic acid.

3. The symmetrical anhydride of 12-hydroxy-trans-9-octadecenoic acid.

4. The symmetrical anhydride of 12-hydroxyoctadecanoic acid.

5. The symmetrical anhydride of 9,10,12-trihydroxyoctadecanoic acid.

6. The symmetrical anhydride of 9,10-dihydroxyoctadecanoic acid.

References Cited by the Examiner

UNITED STATES PATENTS 2,877,247   3/1959   Nichols _____ 260—413

OTHER REFERENCES

Beilstein: Handbuch der Organischen Chemie, General Formelregister, Band XXIX, Dritter Teil, Zweites Erganzungswerk, page 3334, 1918, 2nd suppl.

Krulen et al.: Chem. Abst. 43, 4841i (1949).

CHARLES B. PARKER, *Primary Examiner.*

DANIEL D. HORWITZ, *Examiner.*

ANTON H. SUTTO, *Assistant Examiner.*